US011350363B2

(12) United States Patent
Ljung et al.

(10) Patent No.: US 11,350,363 B2
(45) Date of Patent: May 31, 2022

(54) WAKE-UP RADIO TECHNIQUE

(71) Applicant: Sony Corporation, Tokyo (JP)

(72) Inventors: Rickard Ljung, Helsingborg (SE); Basuki Priyanto, Lund (SE); Nafiseh Mazloum, Lund (SE); Peter C Karlsson, Lund (SE)

(73) Assignee: SONY GROUP CORPORATION, Tokyo (JP)

(*) Notice: Subject to any disclaimer, the term of this patent is extended or adjusted under 35 U.S.C. 154(b) by 50 days.

(21) Appl. No.: 16/495,377

(22) PCT Filed: Mar. 20, 2018

(86) PCT No.: PCT/EP2018/057004
§ 371 (c)(1),
(2) Date: Sep. 18, 2019

(87) PCT Pub. No.: WO2018/172347
PCT Pub. Date: Sep. 27, 2018

(65) Prior Publication Data

US 2020/0022082 A1 Jan. 16, 2020

(30) Foreign Application Priority Data

Mar. 20, 2017 (EP) .................................... 17161839
Mar. 20, 2017 (EP) .................................... 17161876

(51) Int. Cl.
*H04W 52/02* (2009.01)
*H04J 13/00* (2011.01)
(Continued)

(52) U.S. Cl.
CPC ..... *H04W 52/0229* (2013.01); *H04J 13/0048* (2013.01); *H04J 13/0062* (2013.01);
(Continued)

(58) Field of Classification Search
CPC ... H04L 1/0004; H04L 27/0008; H04L 27/04; H04W 8/24; H04W 52/0216; H04W 52/0229; H04W 52/0235; H04W 68/005
(Continued)

(56) References Cited

U.S. PATENT DOCUMENTS 9,525,540 B1 * 12/2016 Shellhammer ...... H04L 27/0008
9,872,252 B1 * 1/2018 Ang .................. H04W 52/0229
(Continued)

FOREIGN PATENT DOCUMENTS

KR 20090114455 A 11/2009

OTHER PUBLICATIONS

RP-170410, Motivation of UE Wakeup Mechanism in NR, 3GPP TSG RAN Meeting #75 (Year: 2017).*
(Continued)

*Primary Examiner* — Harun Chowdhury
(74) *Attorney, Agent, or Firm* — Tucker Ellis LLP

(57) ABSTRACT

A method comprises communicating, between a base station (112) of a network and a terminal (130), at least one downlink control message (4001) indicative of a plurality of reoccurring resources (202) allocated to a wake-up signal (4003). The method further comprises communicating, between the base station (112) and the terminal (130), the wake-up signal (4003) in at least one resource of the plurality of reoccurring resources (202). The method further comprises in response to said communicating of the wake-up signal (4003), communicating, between the base station (112) and the terminal (130), at least one further signal (4004, 4005).

7 Claims, 16 Drawing Sheets

UE 130
eNB 112
4001: control message 3001
4002: user-data message 3002
201
3003
3098
Transition MRx to inactive state
3099
202
202
4003: wakeup signal 3004
202
Transition MRx to active state
3098
3005
4004: paging indicator 3006
4005: paging message 3007
setup data connection 3008
4002: user-data message 3009

(51) Int. Cl.

*H04W 68/00* (2009.01)
*H04W 72/04* (2009.01)
*H04J 13/16* (2011.01)
*H04L 1/00* (2006.01)
*H04W 8/24* (2009.01)

(52) U.S. Cl.

CPC ............ *H04J 13/16* (2013.01); *H04L 1/0004* (2013.01); *H04W 8/24* (2013.01); *H04W 68/005* (2013.01); *H04W 72/042* (2013.01); *H04W 72/0466* (2013.01)

(58) Field of Classification Search

USPC .......................................... 370/252, 311, 329
See application file for complete search history.

(56) References Cited

U.S. PATENT DOCUMENTS

| | | | |
|---|---|---|---|
| 2011/0194493 | A1 | 8/2011 | Centonza et al. |
| 2016/0198240 | A1 | 7/2016 | Kim et al. |
| 2017/0048918 | A1 | 2/2017 | Iwamura et al. |

OTHER PUBLICATIONS

International Search Report and Written Opinion from corresponding International Patent Application No. PCT/EP2018/057004, dated Jul. 23, 2018, 19 pages.

CATT, “Motivation of UE Wakeup Mechanism in NR”, Datang Telecom Technology & Industry Group, 3GPP TSG RAN Meeting #75, RP-170410, Mar. 6-9, 2017, 8 pages.

Qualcomm Incorporated et al., “WF on Study of wake up signal for NR”, 3GPP TSG RAN WG1 NR Ad-Hoc Meeting, R1-1701421, Jan. 16-20, 2017, 4 pages.

Huawei, “Discussion on wake up signal”, 3GPP TSG RAN WG1 Meeting #88, R1-1703333, Feb. 13-17, 2017, 6 pages.

Qualcomm Incorporated, “UE Power Evaluation for DRX with Wake-Up Signaling”, 3GPP TSG-RAN WG1 NR AdHoc, R1-1700820, Jan. 16-20, 2017, 8 pages.

Intel Corporation, “On further evolution of eMTC and NB-Iot in Rel-15 LTE,” 3GPP TSG RAN Meeting #75, RP-170429, Mar. 6-9, 2017, 14 pages.

Qualcomm Incorporated, “Wake-Up Schemes for DRX in NR”, 3GPP TSG-RAN WG2 Meeting #97, R2-1701774, Feb. 13-17, 2017, 4 pages.

Qualcomm Incorporated, “WF on evaluation for wake-up signal”, 3GPP TSG-RAN WG1 NR AdHoc, R1-1700821, Jan. 16-20, 2017, 3 pages.

Ku, et al. “Resource Allocation and Link Adaptation in LTE and LTE Advanced: A Tutorial,” IEEE Communication Surveys & Tutorials, vol. 17, No. 3, Third Quarter 2015.

European Office Action dated Oct. 7, 2021 for Application Serial No. 18710900.4.

Written Decision on Registration dated Jan. 25, 2022 for Korean Application Serial No. KR20197029567 (2 pages).

* cited by examiner

WAKE-UP RADIO TECHNIQUE

TECHNICAL FIELD

Various examples generally relate to communicating a wake-up signal. Various examples relate to using a predefined modulation and/or coding scheme for communicating at least one further signal in response to communicating the wake-up signal. Various examples relate to allocating reoccurring resources to the wake-up signal.

BACKGROUND

Communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up technique. Here, a terminal such as a user equipment (UE) includes two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. During the time the low-power receiver is activated, it may transition between a receiving and a non-receiving state. Then, the low-power receiver can receive the wake-up signal and, in response to receiving the wake-up signal, the main receiver can transition again to the active state.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR".

However, such reference implementations face certain restrictions and drawbacks. For example, such reference implementations may have a limited flexibility when adjusting parameters of the wake-up technique. As a further example, such reference implementations may be associated with a significant latency associated with wake-up of the main receiver.

SUMMARY

Therefore, a need exists for advanced wake-up techniques. A need exists for wake-up techniques which overcome or mitigate at least some of the above-identified drawbacks and limitations.

This need is met by the features of the independent claims. The features of the dependent claims define embodiments.

A method includes communicating, between a base station of a network and a terminal, a wake-up signal. The method further includes communicating, between the base station and the terminal, at least one further signal in accordance with a predefined modulation and/or coding scheme. Said communicating off the at least one further signal is in response to said communicating of the wake-up signal.

It would be possible that the wake-up signal is communicated between the base station and low-power receiver of the terminal; while the at least one further signal is communicated between the base station and a main receiver of the terminal.

A computer program product includes program code to be executed by at least one processor. Executing the program code causes the at least one processor to perform a method. The method includes communicating, between a base station of a network and a terminal, a wake-up signal. The method further includes communicating, between the base station and the terminal, at least one further signal in accordance with a predefined modulation and/or coding scheme. Said communicating off the at least one further signal is in response to said communicating of the wake-up signal.

A computer program includes program code to be executed by at least one processor. Executing the program code causes the at least one processor to perform a method. The method includes communicating, between a base station of a network and a terminal, a wake-up signal. The method further includes communicating, between the base station and the terminal, at least one further signal in accordance with a predefined modulation and/or coding scheme. Said communicating off the at least one further signal is in response to said communicating of the wake-up signal.

A method includes communicating, between a base station of a network and a receiver of a terminal in a low-power state, a wake-up signal. The method further includes communicating, between the base station and the receiver of the terminal in a high-power state, at least one further signal in accordance with a predefined modulation and/or coding scheme. Said communicating off the at least one further signal is in response to said communicating of the wake-up signal.

The low-power state may have an associated energy consumption which is smaller than the energy consumption of the high-power state.

By using a predefined modulation and/or coding scheme, an indicator of the modulation and/or coding scheme may not be required between communicating the wake-up signal and the at least one further signal. Thus, the latency until communicating the at least one further signal can be reduced.

A computer program product includes program code to be executed by at least one processor. Executing the program code causes the at least one processor to perform a method. The method includes communicating, between a base station of a network and a receiver of a terminal in a low-power state, a wake-up signal. The method further includes communicating, between the base station and the receiver of the terminal in a high-power state, at least one further signal in accordance with a predefined modulation and/or coding scheme. Said communicating off the at least one further signal is in response to said communicating of the wake-up signal.

A computer program includes program code to be executed by at least one processor. Executing the program code causes the at least one processor to perform a method.

The method includes communicating, between a base station of a network and a receiver of a terminal in a low-power state, a wake-up signal. The method further includes communicating, between the base station and the receiver of the terminal in a high-power state, at least one further signal in accordance with a predefined modulation and/or coding scheme. Said communicating off the at least one further signal is in response to said communicating of the wake-up signal.

A method includes communicating, between a base station of a network and a terminal, a wake-up signal. The method further includes communicating, between the base station and the terminal, at least one further signal in accordance with a pre-scheduled resource allocation. Said communicating off the at least one further signal is in response to said communicating of the wake-up signal.

A computer program product includes program code to be executed by at least one processor. Executing the program code causes the at least one processor to perform a method. The method includes communicating, between a base station of a network and a terminal, a wake-up signal. The method further includes communicating, between the base station and the terminal, at least one further signal in accordance with a pre-scheduled resource allocation. Said communicating off the at least one further signal is in response to said communicating of the wake-up signal.

A computer program includes program code to be executed by at least one processor. Executing the program code causes the at least one processor to perform a method. The method includes communicating, between a base station of a network and a terminal, a wake-up signal. The method further includes communicating, between the base station and the terminal, at least one further signal in accordance with a pre-scheduled resource allocation. Said communicating off the at least one further signal is in response to said communicating of the wake-up signal.

A method includes communicating, between a base station of a network and a receiver of a terminal in a low-power state, a wake-up signal. The method further includes communicating, between the base station and a receiver of the terminal in a high-power state, at least one further signal in accordance with a pre-scheduled resource allocation. Said communicating of the at least one further signal is in response to said communicating of the wake-up signal.

A computer program product includes program code to be executed by at least one processor. Executing the program code causes the at least one processor to perform a method. The method includes communicating, between a base station of a network and a receiver of a terminal in a low-power state, a wake-up signal. The method further includes communicating, between the base station and a receiver of the terminal in a high-power state, at least one further signal in accordance with a pre-scheduled resource allocation. Said communicating of the at least one further signal is in response to said communicating of the wake-up signal.

A computer program includes program code to be executed by at least one processor. Executing the program code causes the at least one processor to perform a method. The method includes communicating, between a base station of a network and a receiver of a terminal in a low-power state, a wake-up signal. The method further includes communicating, between the base station and a receiver of the terminal in a high-power state, at least one further signal in accordance with a pre-scheduled resource allocation. Said communicating of the at least one further signal is in response to said communicating of the wake-up signal.

A device includes control circuitry configured to communicate, between a base station of a network and a low-power receiver of a terminal, a wake-up signal; and in response to said communicating of the wake-up signal communicating, between the base station and a main receiver of the terminal, at least one further signal in accordance with a predefined modulation and/or coding scheme.

A device includes control circuitry configured to communicate, between a base station of a network and a receiver of a terminal in a low-power state, a wake-up signal; and in response to said communicating of the wake-up signal communicating, between the base station and the receiver of the terminal in a high-power state, at least one further signal in accordance with a predefined modulation and/or coding scheme.

A device includes control circuitry configured to communicate, between a base station of a network and a terminal, a wake-up signal; and in response to said communicating of the wake-up signal communicating, between the base station and the terminal, at least one further signal in accordance with a pre-scheduled resource allocation.

By using the pre-scheduled resource allocation, it is not required to communicate an indicator of the resource allocation between communicating the wake-up signal and communicating the at least one further signal. Thus, latency can be reduced.

A terminal is configured to receive, from a base station of a network, a wake-up signal; and to communicate, with the base station, at least one further signal in accordance with a predefined modulation and/or coding scheme in response to receiving of the wake-up signal.

A terminal is configured to receive, from a base station of a network, a wake-up signal; and communicate, with the base station, at least one further signal in accordance with a pre-scheduled resource allocation in response to receiving of the wake-up signal.

A method includes communicating, between a base station of a network and a terminal, at least one downlink (DL) control message. The DL control message is indicative of a plurality of reoccurring resources allocated to a wake-up signal. The method further includes communicating, between the base station and the terminal, the wake-up signal in at least one resource of the plurality of reoccurring resources. The method further includes, in response to said communicating of the wake-up signal, communicating, between the base station and the terminal, at least one further signal.

A computer program product includes program code to be executed by at least one processor. Executing the program code causes at least one processor to perform a method. The method includes communicating, between a base station of a network and a terminal, at least one DL control message. The DL control message is indicative of a plurality of reoccurring resources allocated to a wake-up signal. The method further includes communicating, between the base station and the terminal, the wake-up signal in at least one resource of the plurality of reoccurring resources. The method further includes, in response to said communicating of the wake-up signal, communicating, between the base station and the terminal, at least one further signal.

A computer program includes program code to be executed by at least one processor. Executing the program code causes at least one processor to perform a method. The method includes communicating, between a base station of a network and a terminal, at least one DL control message. The DL control message is indicative of a plurality of reoccurring resources allocated to a wake-up signal. The method further includes communicating, between the base station and the terminal, the wake-up signal in at least one resource of the plurality of reoccurring resources. The method further includes, in response to said communicating of the wake-up signal, communicating, between the base station and the terminal, at least one further signal.

A method includes communicating, between a base station of a network and a receiver of a terminal in a high-power state, at least one downlink (DL) control message. The DL control message is indicative of a plurality of reoccurring resources allocated to a wake-up signal. The method further includes communicating, between the base station and the receiver of the terminal in a low-power state, the wake-up signal in at least one resource of the plurality of reoccurring resources. The method further includes, in response to said communicating of the wake-up signal, communicating, between the base station and the receiver of the terminal in the high-power state, at least one further signal.

A computer program product includes program code to be executed by at least one processor. Executing the program code causes at least one processor to perform a method. The method includes communicating, between a base station of a network and a receiver of a terminal in a high-power state, at least one downlink (DL) control message. The DL control message is indicative of a plurality of reoccurring resources allocated to a wake-up signal. The method further includes communicating, between the base station and the receiver of the terminal in a low-power state, the wake-up signal in at least one resource of the plurality of reoccurring resources. The method further includes, in response to said communicating of the wake-up signal, communicating, between the base station and the receiver of the terminal in the high-power state, at least one further signal.

A computer program includes program code to be executed by at least one processor. Executing the program code causes at least one processor to perform a method. The method includes communicating, between a base station of a network and a receiver of a terminal in a high-power state, at least one downlink (DL) control message. The DL control message is indicative of a plurality of reoccurring resources allocated to a wake-up signal. The method further includes communicating, between the base station and the receiver of the terminal in a low-power state, the wake-up signal in at least one resource of the plurality of reoccurring resources. The method further includes, in response to said communicating of the wake-up signal, communicating, between the base station and the receiver of the terminal in the high-power state, at least one further signal.

A device includes control circuitry configured to communicate, between a base station of a network and a main receiver of a terminal, at least one downlink control message indicative of a plurality of reoccurring resources allocated to a wake-up signal; and communicate, between the base station and a low-power receiver of the terminal, the wake-up signal in at least one resource of the plurality of reoccurring resources; and in response to said communicating of the wake-up signal, communicate, between the base station and the main receiver of the terminal, at least one further signal.

A device includes control circuitry configured to communicate, between a base station of a network and a receiver of a terminal in a high-power state, at least one downlink control message indicative of a plurality of reoccurring resources allocated to a wake-up signal; and communicate, between the base station and the receiver of the terminal in a low-power state, the wake-up signal in at least one resource of the plurality of reoccurring resources; and in response to said communicating of the wake-up signal, communicate, between the base station and the receiver of the terminal in the high-power state, at least one further signal.

A terminal is configured to receive, from a base station of a network, at least one downlink control message indicative of a plurality of reoccurring resources allocated to a wake-up signal; and to receive, from the base station, the wake-up signal in at least one resource of the plurality of reoccurring resources. The terminal is further configured to communicate, with the base station, at least one further signal in response to receiving the wake-up signal.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
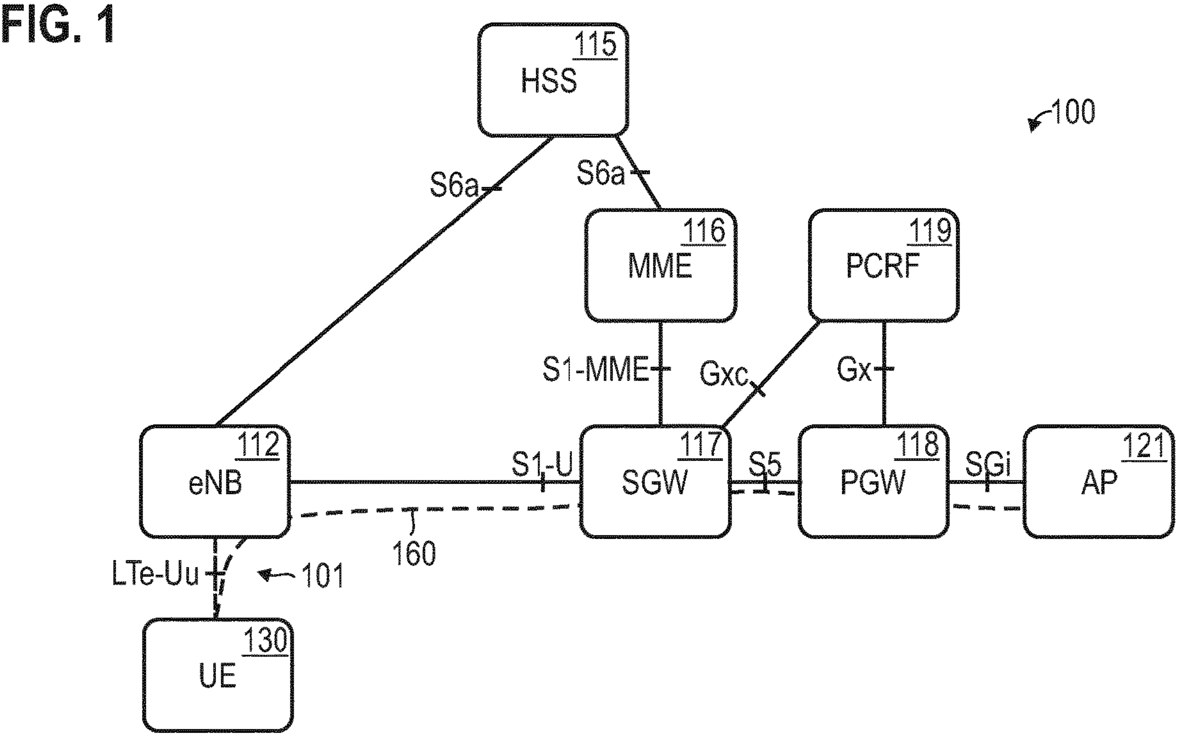
FIG. 1 schematically illustrates a network including a UE and a base station (BS) according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition the main receiver into an low-power state, e.g., for power-saving purposes. In some examples, the low-power state of the main receiver may be an inactive state.

In the inactive state the UE only listens to wake-up signals and not to other transmissions, such as paging signals or signals communicated on a payload or higher-layer control channel. For example, a bandwidth on which the UE listens for signals in inactive state may be smaller than in an active state in which the UE also listens for further signals. For example, a decoding/demodulation capability may be limited to less complex coding and/or modulation schemes for inactive state vs. the active state.

Thereby, in the inactive state power consumption can be significantly reduced if compared to an active state of the main receiver. For example, the main receiver may be unfit to receive any data in the inactive state such that some or all components may be shut down. Wake-up of the main receiver from the inactive state is then triggered by a wake-up signal.

The wake-up signal may be received by a dedicated low-power receiver of the UE. The wake-up signal may have a comparably simple modulation, e.g., On-Off Keying or the like, which facilitates a simple time-domain operation by the low-power receiver.

It is expected, but not required that the power consumption consumed by the low-power receiver when receiving the wake-up signal is lower than the power consumption consumed by the main receiver when receiving signals from the base station.

In other examples, the wake-up signal may be received by the main receiver in the low-power state. Here, it may not be required to provision a dedicated low-power receiver.

Various techniques described herein enable reduction of latency associated with a transition of the main receiver from the low-power state to active an active state or high-power state and subsequent communication required prior to communicating a user-data message.

Furthermore, various techniques described herein enable to flexibly scheduling or co-scheduling multiple devices to resources allocated to the wake-up signal.

According to examples, different resources may be allocated to the wake-up signals intended for different UEs. According to further examples, different sequence design parameters may be chosen for the wake-up signals intended for different UEs. Thus, within a given cell of a cellular network, different wake-up signals and/or different resources allocated to wake-up signals may be used.

The techniques described herein may find application in various fields. An example application relates to IOT UEs. Such IOT UEs often transmit and/or receive (communicate) data only once or a few times per day or even per week. The remaining time is idle. In an idle mode, a DRX cycle can be used to repeatedly activate a receiver to receive paging indicators from the network.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology (RAT), particularly LTE MTC for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. Similar techniques can also be potentially applied to 5G New Radio (NR), and NR-IoT.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

Other examples include other types of networks, e.g., Institute of Electrical and Electronics Engineers (IEEE) 802.11X Wireless Local Area Network, Bluetooth or Zigbee, and potentially the 5G New Radio (NR) system.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled evolved node B (eNB) in FIG. 1.

For example, the UE 130 may be selected from the group including: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 101 can be in uplink (UL) and/or DL direction. Details of the wireless link 101 are illustrated in FIG. 2.

Figure 2:
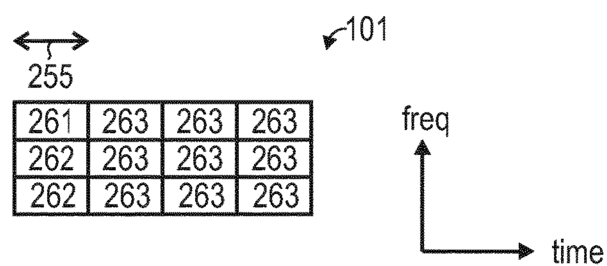
FIG. 2 schematically illustrates various channels implemented on a wireless link of the network according to various examples.

FIG. 2 illustrates aspects with respect to channels implemented on the wireless link 101. The wireless link 101 implements a plurality of communication channels 261-263. Transmission frames 255—e.g., implemented by sub-frames—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry synchronization signals for acquiring a timing of the BS 112.

A second channel 262 may be associated with control messages (control channel 262). The second channel 262 may carry paging signals or paging indicators which enable the network 100—e.g., the MME 116—to page the UE 130 when the UE 130 is in idle mode. The control messages may configure operation of the UE 130, the BS 112, and/or the wireless link 101. For example, radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH). At least some of the control messages communicated on the control channel 262 may correspond to Layer 2 or Layer 3 control messages in the Open Systems Interface (OSI) model of a transmission protocol stack, i.e., data link or network layer.

Further, a third channel 263 is associated with a payload messages carrying higher-layer user-plane data packets associated with a given service implemented by the UE 130 and the BS 112 (payload channel 263). User-data messages may be transmitted via the channel 263. According to the E-UTRAN RAT, the payload channel 263 may be a Physical DL Shared Channel (PDSCH) or a Physical UL Shared Channel (PUSCH). Also some control messages may be transmitted via the channel 263, e.g., a paging message.

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130. The end-to-end connection 160 may be used for communicating data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
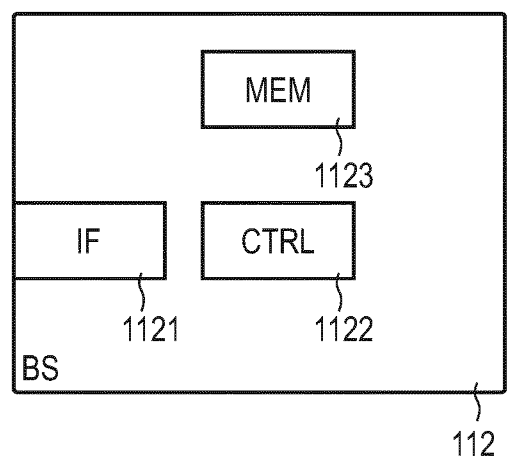
FIG. 3 schematically illustrates a BS according to various examples.

FIG. 3 schematically illustrates the BS 112. The BS 112 includes an interface 1121. For example, the interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: transmitting wake-up signals; negotiating and/or implementing properties of the wake-up signal; scheduling of devices to resources allocated to wake-up signals; etc.

Figure 4:
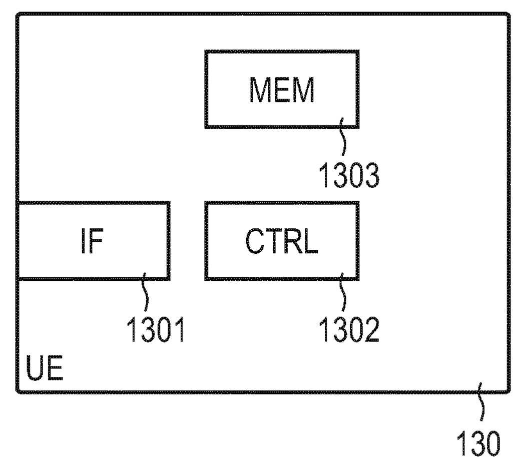
FIG. 4 schematically illustrates a UE according to various examples.

FIG. 4 schematically illustrates the UE 130. The UE 130 includes an interface 1301. For example, the interface 1301 may include an analog front end and a digital front end. In some examples, the interface 1301 may include a main receiver and a low-power receiver. Each one of the main receiver and the low-power receiver may include an analog front end and a digital front end, respectively. The UE 130 further includes control circuitry 1302, e.g., implemented by means of one or more processors and software. The control circuitry 1302 may also be at least partly implemented in hardware. For example, program code to be executed by the control circuitry 1302 may be stored in a non-volatile memory 1303. In the various examples disclosed herein, various functionality may be implemented by the control circuitry 1302, e.g., receiving wake-up signals; transitioning the main receiver between an inactive state and an active state; implementing a discontinuous reception cycle of the main receiver and/or of the low-power receiver; etc.

Figure 5:
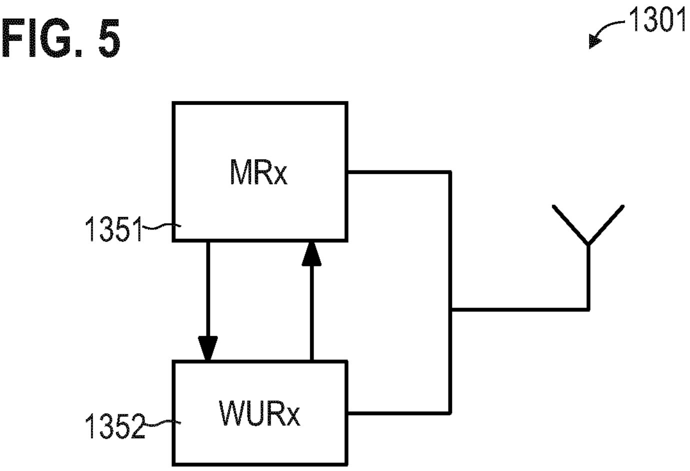
FIG. 5 schematically illustrates an interface of the UE including a main receiver and a low-power receiver according to various examples.

FIG. 5 illustrates details with respect to the interface 1301 of the UE 130. In particular, FIG. 5 illustrates aspects with respect to the main receiver 1351 and the low-power receiver 1352. In FIG. 5, the main receiver 1351 and the low-power receiver 1352 are implemented as separate entities. For example, they may be implemented on different chips. For example, they may be implemented in different housings. For example, they may not share a common power supply.

The scenario FIG. 5 may enable switching off some or all components of the main receiver 1351 when operating the main receiver in inactive state.

Figure 6:
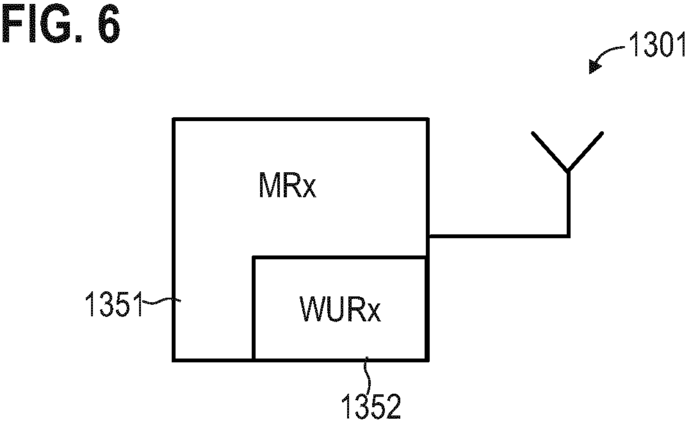
FIG. 6 schematically illustrates an interface of the UE including a main receiver and a low-power receiver according to various examples.

FIG. 6 illustrates details with respect to the interface 1301 of the UE 130. In particular, FIG. 6 illustrates aspects with respect to the main receiver 1351 and the low-power receiver 1352. In FIG. 6, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 6 may enable a particular short latency for transitioning between reception by the wake-up receiver 1352 and reception by the main receiver 1351.

While in FIGS. 5 and 6 a scenario is illustrated where the main receiver 1351 and the low-power receiver 1352 share a common antenna, in other examples, it would be also possible that the interface 1301 includes dedicated antennas for the main receiver 1351 and the low-power receiver 1352.

While in the examples of FIGS. 5 and 6 scenarios are illustrated where there is a dedicated low-power receiver 1352, in other examples there may be no low-power receiver. Instead, the wake-up signal may be received by the main receiver 1351 in a low-power state. For example, the main receiver 1351 may not be fit to receive ordinary data other than the wake-up signal in the low-power state. Then, in response to receiving the wake-up signal, the main receiver 1351 may transition into a high-power state in which it is fit to receive the ordinary data, e.g., on PDSCH or PDCCH, etc.

Figure 7:
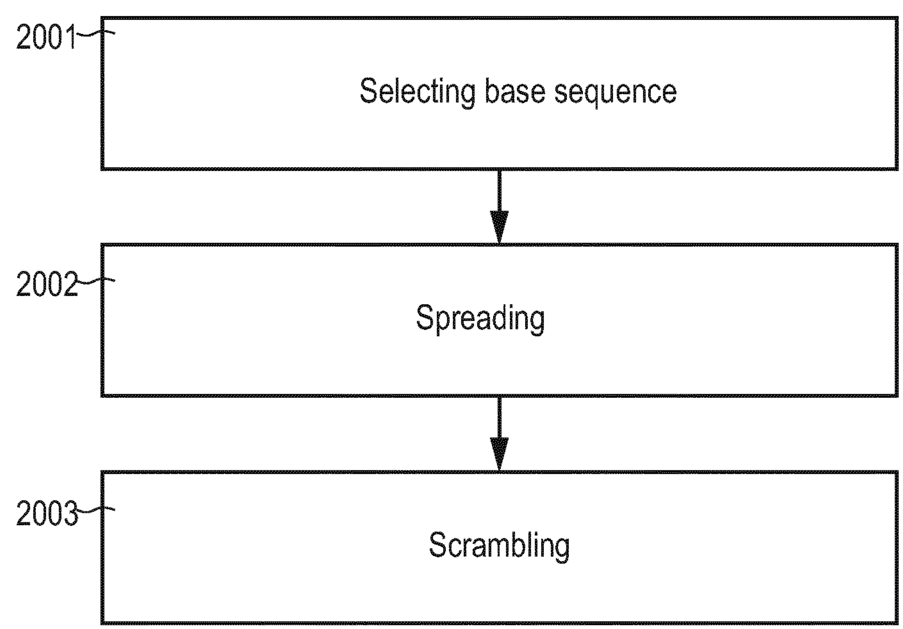
FIG. 7 is a flowchart of a method according to various examples.

FIG. 7 is a flowchart of a method according to various examples. FIG. 7 illustrates aspects with respect to constructing the wake-up signal. For example, the method according to FIG. 7 could be executed by the control circuitry 1122 of the BS 112. FIG. 7 illustrates aspects with respect to a sequence design of the wake-up signal.

First, a certain base sequence is selected, 2001. For example the base sequence may be a randomly generated set of bits. For example the base sequence may be unique for a UE or a group of UEs. For example, the base sequence may be selected from the group including: a Zadoff-Chu sequence; a sequence selected from a set of orthogonal or quasi-orthogonal sequences; a Walsh-Hadamard sequence; a PN sequence; and a M sequence. For example, selecting the particular base sequence or type of base sequence can be subject to sequence design of the wake-up signal. For example, setting the sequence length of the base sequence of the wake-up signal can be subject to sequence design of the wake-up signal.

In some examples, different base sequences may be selected for different wake-up signals. In particular, the base sequence may be selected based on an intended recipient of the wake-up signal, i.e., depending on the particular UE 130 to which the wake-up signal is to be transmitted. In other words, it may be possible that the base sequence is uniquely associated with the respective UE 130 as the intended recipient of the wake-up signal. Different UEs may be addressed by different base sequences.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the wake-up signal.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the wake-up signal.

In some examples, it may be possible to additionally add a checksum to the wake-up signal. Adding a checksum may be subject to sequence design of the wake-up signal. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc.

In some examples, it may be possible to additionally at a preamble to the wake-up signal. The preamble may include a sequence of preamble bits. For example, the sequence of preamble bits may have a specific length. The sequence of preamble bits may enable robust identification of the wake-up signal, e.g., even in presence of burst errors, etc. Presence of the preamble, length of the preamble, and/or type of the preamble sequence, etc. can be properties that can be set according to a preamble parameter in sequence design of the wake-up signal.

Figure 8:
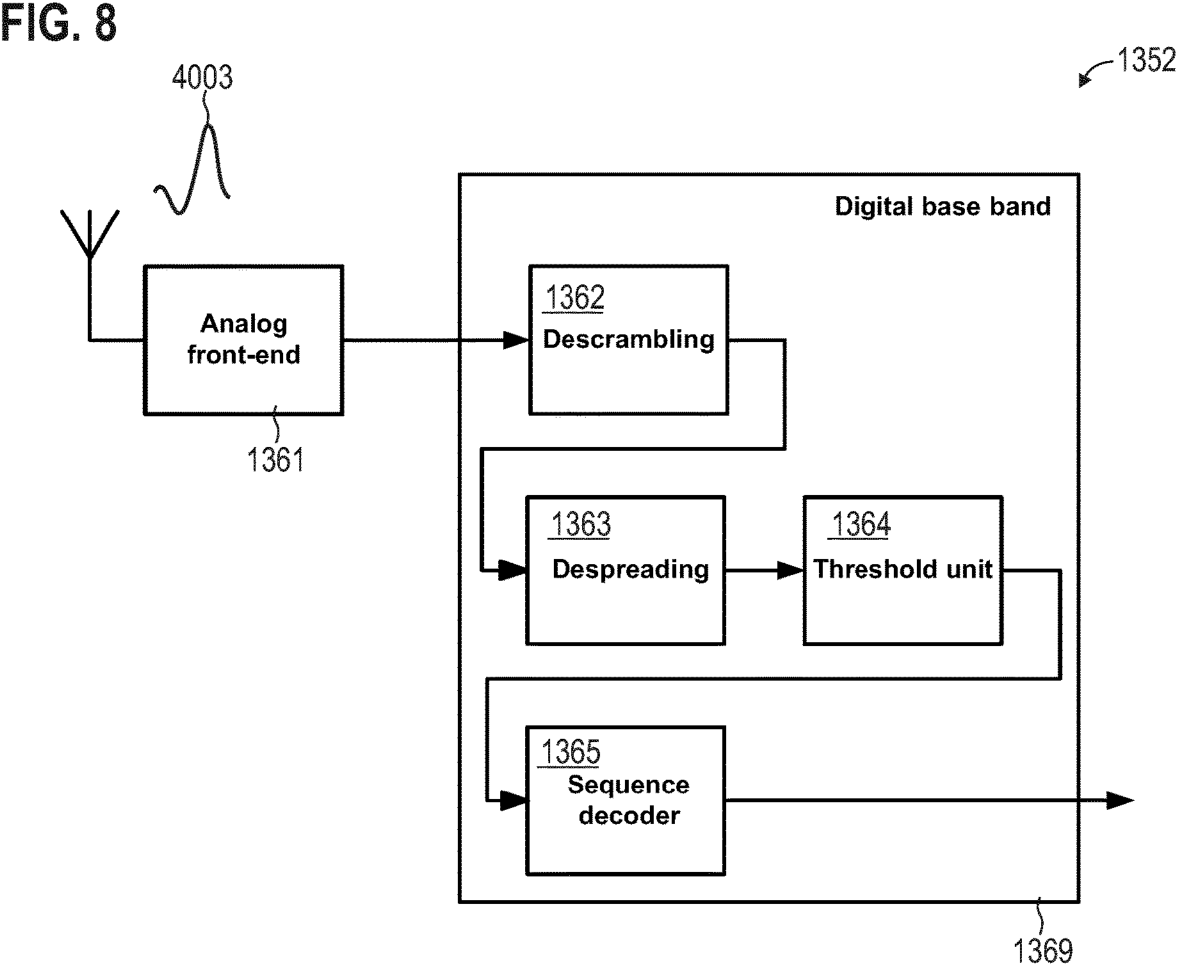
FIG. 8 schematically illustrates details of the low-power receiver according to various examples.

FIG. 8 illustrates aspects with respect to the low-power receiver 1352 of the interface 1301. In the example of FIG. 8, the low-power receiver 1352 includes an analog front end 1361 and a digital front end 1369.

FIG. 8 illustrates aspects with respect to the processing of a wake-up signal 4003 received by the low-power receiver 1352. The analog front end 1361 outputs a bit sequence corresponding to the wake-up signal 4003 in the baseband to the digital front end 1369.

In the various examples described herein, time-domain and/or frequency-domain processing is employed to identify the wake-up signal 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the wake-up signal by the digital front end 1369 may be comparably simple—e.g., if compared to processing of a paging indicator. In legacy LTE, once the UE is scheduled a paging occasion, i.e., allocated to listen to a paging indicator, the UE is expected to be ready to decode PDCCH. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the wake-up signal may be transmitted independent of the PDCCH. Dedicated resources may be allocated to the wake-up signal. The wake-up signal may be transmitted prior to the UE accessing the PDCCH. Once the UE has detected a wake-up signal that is assigned to that UE, then the UE may start to decode the PDCCH.

The wake-up signal may be referred to as a simplified paging indicator, because it may only include the UE identity or group identity and the signals may be constructed a different ways.

The wake-up signal and the paging signal may employ different physical channels. The wake-up signal may not include reference to the P-RNTI—included in the paging signal—for UE-specific identification. The wake-up signal may be designed so that it requires less UE computation/calculation than reception and decoding of the paging signal.

For example, with respect to the wake-up signal, it may not be preferred to have channel coding such turbo code, convolutional code, etc. The wake-up signal can be a robust signal, such that does not operate with higher order modulation. It can be a lower order modulation, such as On-Of-Keying (OOK), BPSK. The wake-up signal may employ a modulation scheme that has low peak to average power ratio property. The wake-up signal can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the wake-up signal 4003 was addressed to the particular UE 130 and possibly further UEs. Based on said cross correlating, it is then possible to selectively transition the main receiver 1351 from an inactive state to an active state.

By means of spreading and/or scrambling of the base sequence, more reliable crosscorrelation can be performed. For example, by spreading the base sequence, a longer sequence is obtained for the wake-up signal 4003 transmitted over the air. Longer sequences generally are more robust to false positives when performing the crosscorrelation.

Figure 9A:
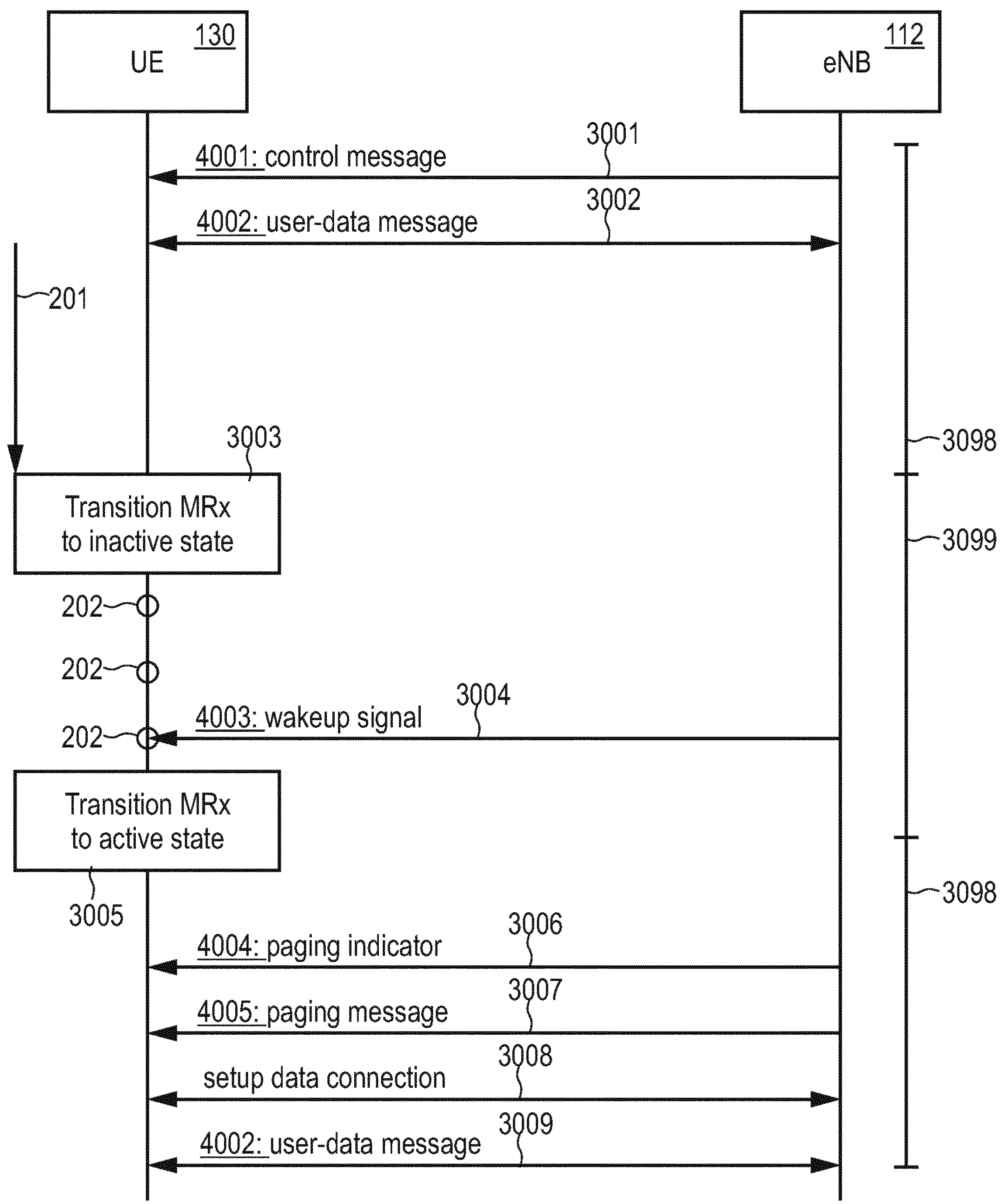
FIG. 9A is a signaling diagram of communication between the BS and the UE according to various examples.

FIG. 9A is a signaling diagram. FIG. 9A illustrates aspects with respect to communicating between the UE 130 and the BS 112. FIG. 9A illustrates aspects with respect to transmitting and/or receiving (communicating) a wake-up signal 4003.

At 3001, a control message 4001 is communicated. For example, the control message may be communicated on the control channel 262, e.g., PDCCH. For example, the control message may be a Layer 2 or Layer 3 control message.

The control message 4001 may be indicative of certain properties associated with the wake-up technology implemented by the UE 130. For example, the control message may configure an inactivity schedule 201 of the main receiver 1351 of the UE 130. For example, the control message 4001 may be indicative of a plurality of reoccurring resources allocated to the wake-up signal 4003. For example, the control message 4001 may be indicative of a modulation and/or coding scheme (MCS).

In some examples, only a modulation scheme may be indicated. In other examples, only a coding scheme may be specified. In other examples, both, the modulation scheme, as well as the coding scheme may be specified. For example, if no channel coding is employed, the MCS may only specify the modulation.

It would be possible that the control message 4001 is communicated during an attach procedure of the UE 130 to the network 100. For example, the control message 4001 could be communicated while the data connection 160 is active. For example, the control message 4001 could be re-transmitted—e.g., indicating different values—from time to time. For example, it would be possible that the control message 4001 is broadcast by the BS 112 to multiple UEs. In some examples, it would also be possible that one or more properties are negotiated between the UE 130 and the BS 112; then, the control message 4001 may be communicated as part of such a bi-directional negotiation which may include further control messages (not shown in FIG. 9A).

At 3002, a user-data message 4002 is communicated. For example, the user-data message 4002 may be communicated on the payload channel 263. For example, the user-data message 4002 may be communicated along the data connection 160, e.g., as part of a bearer, etc.

Then, there is no more data to be communicated between the UE 130 and the BS 112. Transmit buffers are empty. This may trigger a timer. For example, the timer may be implemented at the UE 130. After a certain timeout duration set in accordance with the inactivity schedule 201, the main receiver 1351 of the UE 130 is transitioned into the inactive state 3099 from the active state 3098, 3003. This is done in order to reduce the power consumption of the UE 130. For example, prior to the transitioning the main receiver 1351 to the inactive state 3099, it would be possible to release the data connection 160 by appropriate control signaling on the control channel 262 (not illustrated in FIG. 9A). Hence, the UE 130 transitions from a connected mode to an idle mode, as will be explained in further detail with respect to FIG. 11. 4001 and 4002 are communicated with the main receiver 1351.

Thus, as will be appreciated, before transitioning from the active state 3098 to the inactive state 3099, the MCS for use after transitioning back from the inactive state 3099 to the active state 3098 may be set by means of the control message 4001.

Figure 10:
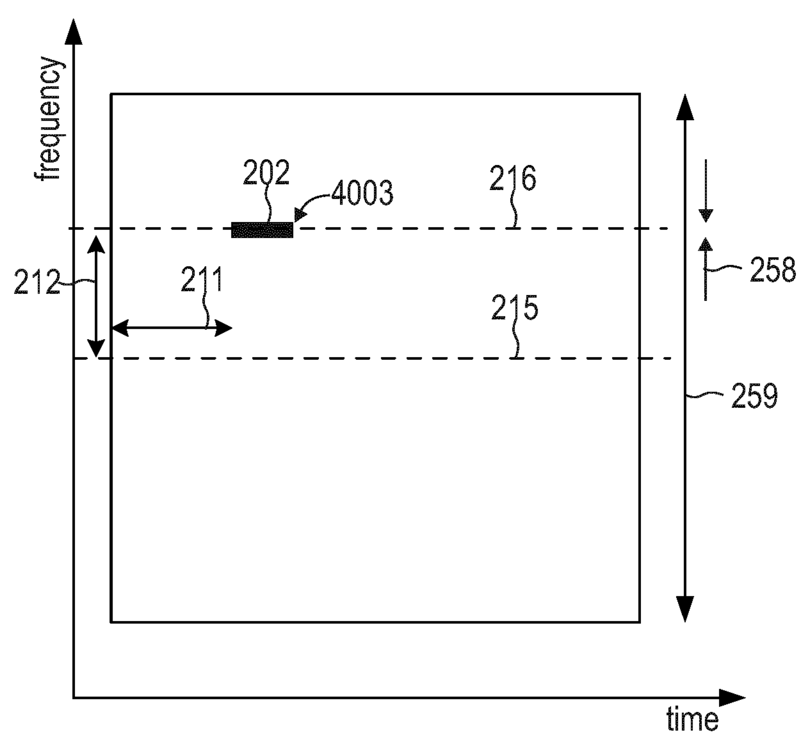
FIG. 10 schematically illustrates a time-frequency resource allocated to a wake-up signal according to various examples.

Multiple transmission opportunities for communicating the wake-up signal 4003 are then implemented by reoccurring resources 202. For example, the resources 202 may be radio resources defined in a time-frequency grid used for communication with the main receiver 1951; this avoids interference with further UEs communicating with the BS 112. This is illustrated in FIG. 10. For example, the resources 202 may correspond to resource blocks of the time-frequency resource grid, the blocks including multiple resource elements. For example, the resources 202 may correspond to resource elements of the time-frequency resource grid; a single resource element may be defined by a symbol modulated by a certain constellation. Hence, the resource element may occupy a frequency bandwidth which corresponds to the bandwidth of the corresponding subcarrier.

Communication with the main receiver 1351 and communication with the low-power receiver 1352 may employ different carriers 215, 216. The bandwidth 258 of the carrier 216 may be much smaller than the bandwidth 259 of the carrier 215.

The frequency bandwidth of the resources 202 may be smaller than the frequency bandwidth 259 of the carrier 215 used for communication with the main receiver 1351. For example, the resources 202 may be defined with a certain frequency offset 212 with respect to a center carrier frequency 215 employed for communicating with the main receiver 1351. For example, the resource 202 may be defined with a certain frequency offset 212 with respect to a center carrier frequency (cf. FIG. 10) or with respect to the lowest frequency, e.g., subcarrier 0 or resource block 0. In particular, it may be possible that the center frequency of the carrier 216 employed for communicating the wake-up signal 4003 with the low-power receiver 1352 is offset from the center frequency of the carrier 215 employed for communicating with the main receiver 1351.

For example, the resources 202 may be defined with respect to a certain time offset 211 with respect to subframes or frames used for communicating on the wireless link 101. Here, time synchronization with the BS 112 may be implemented. Alternatively, time synchronization may not be required and the low-power receiver may simply listen to the ongoing traffic for a certain time duration with some overhead to account for timing drifts.

The reoccurring resources 202 may be arranged with a fixed periodicity. Generally, the reoccurring resources 202 may be arranged in accordance with a certain timing. Frequency hopping is possible. For example, indication of the reoccurring resources may specify the timing or periodicity, the frequency and time offset.

In some examples, the reoccurring resources 202 may be aligned with a discontinuous reception cycle of a respective mode according to which the UE 130 operates.

Again referring to FIG. 9A: In some examples, the control message 4001 may be indicative of the reoccurring resources 202. Different reoccurring resources 202 may be allocated to the wake-up signal over the course of time. Hence, multiple control messages 4001 may be communicated over the course of time.

By signaling the reoccurring resources, it is possible to dynamically adjust the reoccurring resources 202—e.g., if compared to a static allocation, e.g., depending on the cell identity of the BS 112 or the like. Furthermore, time duplexing and/or frequency duplexing may be employed in order to distinguish between different UEs when transmitting wakeup signals 4003. Thus, different resources 202 may be scheduled for wake-up signals 4003 to be transmitted to different UEs.

At some point in time, the BS 112 transmits a wake-up signal 4003, 3004. This may be because there is DL data—e.g., payload data or control data—scheduled for transmission to the UE 130 in a transmit buffer. Another trigger criteria for transmitting the wake-up signal 4003 are conceivable. The wake-up signal 4003 is received by the UE 130.

In response to receiving the wake-up signal 4003, the main receiver 1351 of the UE 130 is transitioned to the active state 3098, 3005.

Then, at 3006, a paging indicator 4004 is transmitted by the BS 112 to the UE 130. The paging indicator 4004 is received by the main receiver 1351. For example, the paging indicator may be transmitted on channel 262, e.g. PDCCH. For example, the paging indicator may include a temporary or static identity of the UE 130. The paging indicator or may be indicative of a plurality of UEs, because the indicator may be derived from unique identities of the UEs such as the International Mobile Subscriber Identity (IMSI) or the like in an ambiguous manner. Examples of the identity of one or more UEs that may be included in paging indicator or 4004 may include a Paging Radio Network Temporary Identifier (P-RNTI) in the 3GPP LTE framework. The P-RNTI may not refer to a particular UE, but to a group of UEs. The P-RNTI may be derived from the IMSI of the subscriber to be paged and constructed by the BS.

For example, in case the wake-up signal is already UE specific, this paging indicator may be just a control message and include Cell Radio Network Temporary Identifier (C-RNTI), e.g., instead of the P-RNTI. For example, it is possible that the paging indicator does not include a UE-specific indicator, but merely includes, e.g., a cell-specific indicator.

The paging indicator may also include information on a MCS used for communicating a paging message 4005 at 3007. The paging message 4005 may be communicated on a shared channel 263, e.g., PDSCH. Generally, the paging indicator 4004 and the paging message 4005 may be communicated on different channels. The paging message 4005 may be modulated and encoded according to the MCS indicated by the paging indicator 4004. Thus, it may be required that the UE 130 receives, firstly, the paging indicator 4004 and, secondly, the paging message 4005.

Then, at 3008, a data connection 160 is set up between the UE 130 and the BS 112. This may include a random access procedure and a Radio Resource Control (RRC) set up.

Finally, a UL or DL user-data message 4002 is communicated using the newly set up data connection 160 at 3009.

As will be appreciated from FIG. 9A, upon transitioning the main receiver 1351 to the active state 3098 at 3005, the data connection 160 needs to be reestablished. For this reason, the UE 130 operates in idle mode—when no data connection 160 is set up or maintained—during the inactive state 3099 of the main receiver 1351. The MCS and/or resource allocation for the respective paging signals 4004, 4005 is predefined by means of the control message 4001—prior to transitioning into idle mode at 3003. However, in the various examples described herein, other implementations of the particular mode in which the UE 130 operates during the inactive state 3099 are conceivable.

Figure 9B:
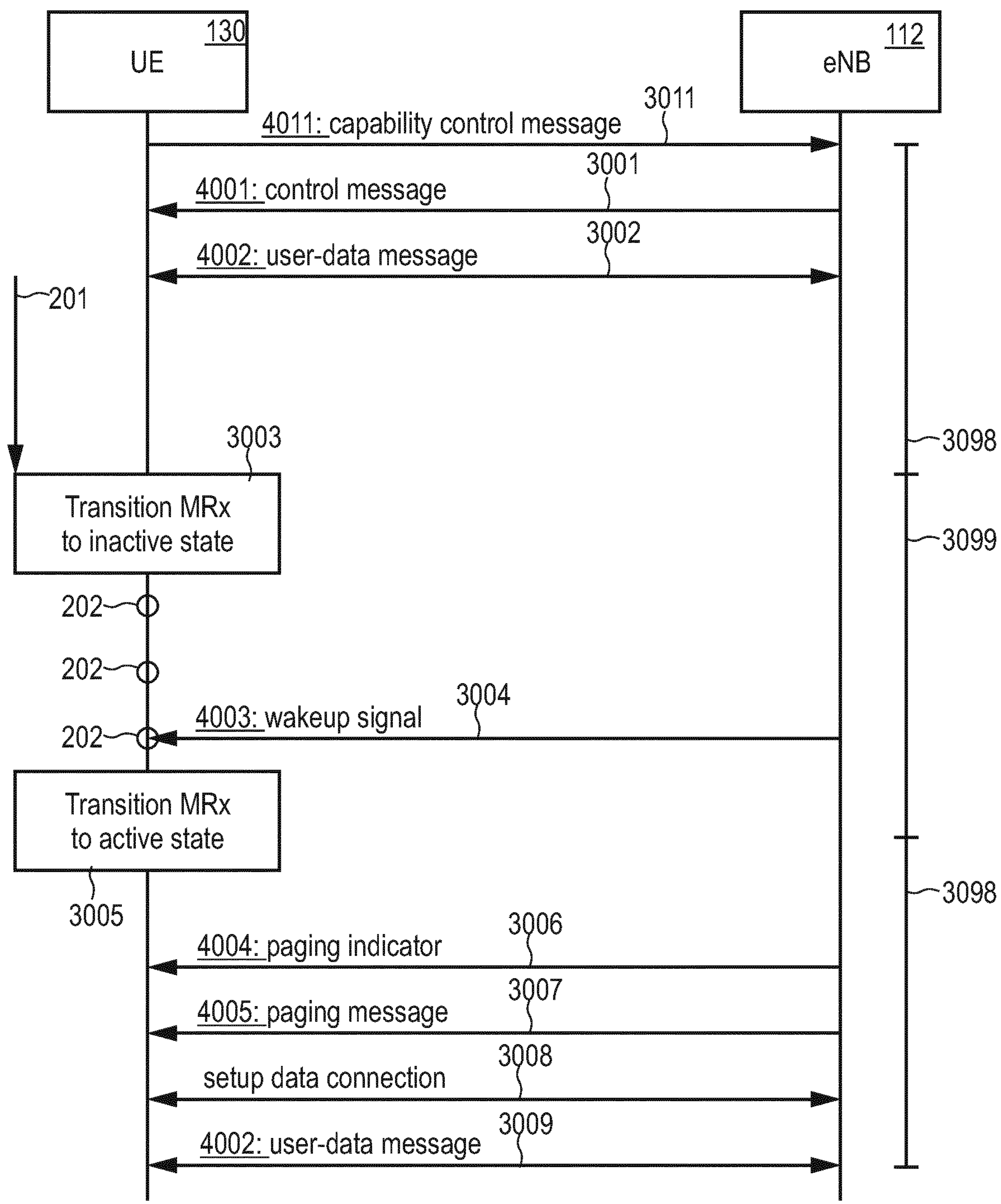
FIG. 9B is a signaling diagram of communication between the BS and the UE according to various examples.

FIG. 9B is a signaling diagram. FIG. 9B illustrates aspects with respect to communicating between the UE 130 and the BS 112. FIG. 9B illustrates aspects with respect to transmitting and/or receiving (communicating) a wake-up signal 4003.

The example of FIG. 9B generally corresponds to the example of FIG. 9A. In FIG. 9B, a capability control message 4011 is additionally communicated at 3011. The capability control message 4011 is transmitted by the UE 130 and received by the BS 112. The capability control message 4011 is indicative of a capability of the UE 130 to support the inactivity schedule 201 of the main receiver 1531. For example, if the UE 130 did not include the low-power receiver 1532, this could be indicated by means of the capability control message 4011. Then, a wake-up mode (cf. FIG. 11: modes 304, 305) may not be activated at all. Wake-up signaling may not be used. Also, it would be possible to indicate certain constraints imposed by the UE capability on the inactivity schedule 201 of the main receiver, e.g., a boot time required to activate the active state 3098 when operating in the inactive state 3099.

In the scenario of FIG. 9B, the inactivity schedule 201 of the main receiver 1531 is supported by the UE 130. Therefore, the scenario as already explained above with respect to FIG. 9A commences. Generally, communicating of the wake-up signal 4003 may selectively be executed depending on the capability of the UE 130 to support the inactivity schedule 201.

Figure 11:
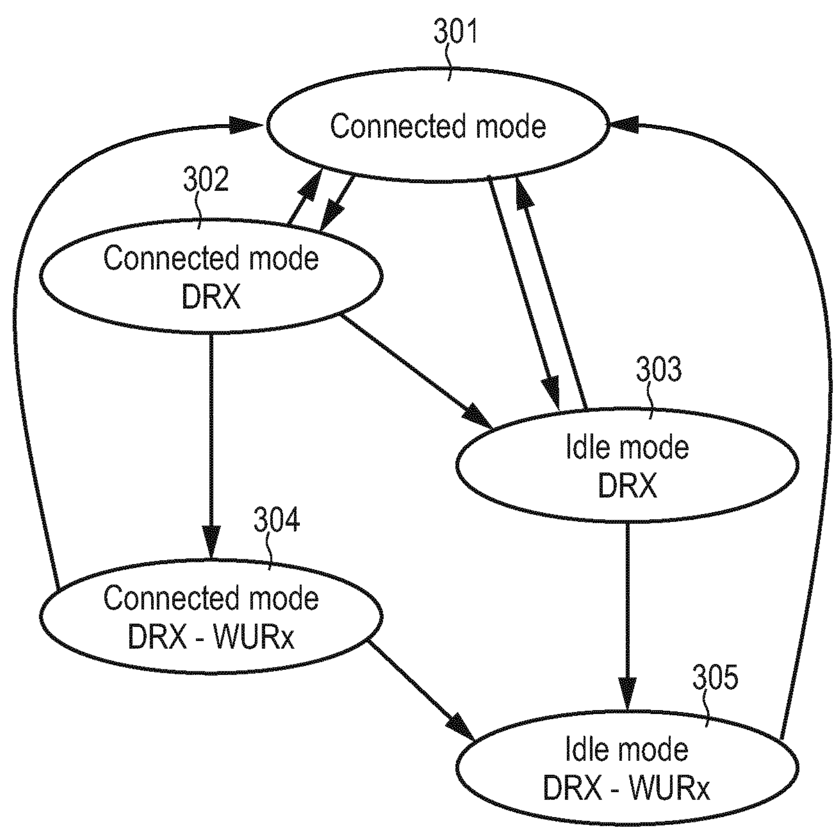
FIG. 11 schematically illustrates different modes of operation of the UE according to various examples.

FIG. 11 illustrates aspects with respect to different modes 301-305 in which the UE 130 can operate.

During connected mode 301, a data connection 160 is set up. For example, a default bearer and optionally one or more dedicated bearers may be set up between the UE 130 and the network 100. In order to reduce the power consumption, it is then possible to transition from the connected mode 301 to a connected mode 302 which employs a discontinuous reception (DRX) cycle of the main receiver 1351. The DRX cycle includes on durations and off durations. During the off durations, the main receiver 1351 is unfit to receive data. The timing of the DRX cycle is synchronized between the UE 130 and the BS 112 such that the BS 112 can align any DL transmission with the on durations of the connected mode DRX cycle. The bearer 160 is maintained set-up in mode 302.

To achieve a further power reduction, it is possible to implement in idle mode 303. The idle mode 303 is, again, associated with the DRX cycle of the main receiver 1351 of the UE 130. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state 3098. The low-power receiver 1352 is not required.

In the example of FIG. 11, two more modes 304, 305 are illustrated. Both modes 304, 305 relate to scenarios where the main receiver 1351 is operated in the inactive state 3099. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 160 is maintained between the UE 130 and the network 100. Transition into mode 304 may be determined by the inactivity schedule 201. In mode 304, it would be possible that a further signal which is communicated in response to communicating the wake-up signal directly encodes a user-data message associated with the data connection 160. No random access procedure is required. Thus, in such an example, the data connection 160 between the network 100 and the UE 100 may be established and the wake-up signal may then be communicated while the connection 160 is established. In such a scenario, the BS 112 may have to select between transmitting a DL scheduling grant indicative of resources allocated to a DL user-data message on the DL shared channel and transmitting the wakeup signal, depending on the inactivity schedule 201 of the main receiver 1251. The UE 130, in mode 304, is not required to repeatedly listen for downlink control information (DCI). Mode 304 offers low latency transmission of payload data, possibly at the expense of more complicated bookkeeping, e.g., by the BS 112.

Differently, in the mode 305, the data connection 160 is not maintained between the UE 130 and the network 100. A random access procedure, triggered by paging, may be required (cf. FIGS. 9A and 9B).

In the example of FIG. 11, scenarios illustrated, where both low-power receiver modes 304, 305 implement a DRX cycle of the low-power receiver 1532. Hence, the wake-up signal 4003 is communicated in accordance with the timing of the DRX cycle. However, generally, it would also be possible to implement the modes 304, 305 such that the low-power receiver 1352 is persistently fit to receive wake-up signals, i.e., does not implement on durations and off durations.

Figure 12:
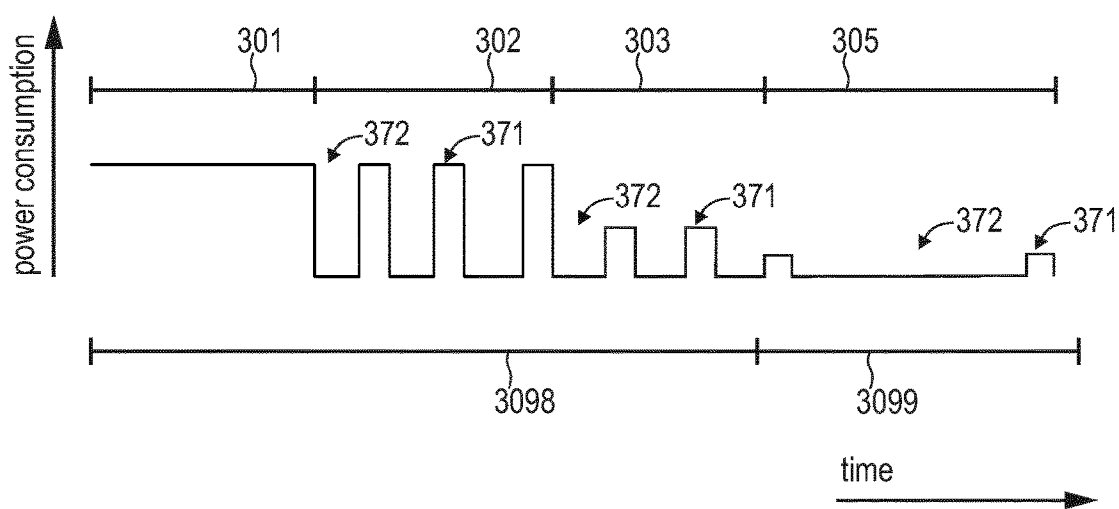
FIG. 12 schematically illustrates power consumption for different modes of operation of the UE according to various examples.

FIG. 12 illustrates aspects with respect to switching between the different modes 301-305. First, the UE 130 operates in the connected mode 301. This causes a persistent power consumption at a high level. Then, in order to reduce the power consumption, the connected mode 302 employing DRX is activated. Here, the on durations 371 and the off durations 372 of the main receiver 1351—operating in active state 3098—are illustrated.

To further reduce the power consumption, next, the idle mode 303 is activated. This is accompanied by releasing the data connection 160. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351 can be reduced if compared to the connected mode 302. During idle mode 303, the main receiver 1351 only expects reception of paging indicators or paging messages.

Finally, to even further reduce the power consumption, the idle mode 305 is activated. Upon transitioning into the idle mode 305, the main receiver 1351 is transitioned from the active state 3098 to the inactive state 3099. A DRX cycle is again implemented including on durations 371 and off durations 372.

Figure 13:
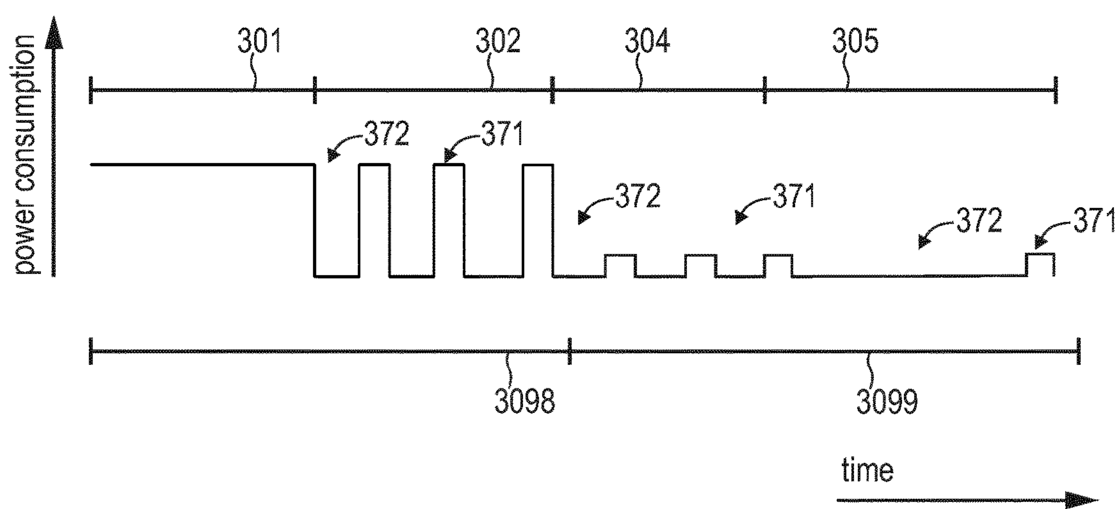
FIG. 13 schematically illustrates power consumption for different modes of operation of the UE according to various examples.

FIG. 13 illustrates aspects with respect to different modes 301-305 in which the UE 130 can operate.

The example of FIG. 13 generally corresponds to the example of FIG. 12. Here, instead of activating the idle mode 303, the connected mode 304 is activated. When operating the UE 130 in the connected mode 304, the data connection 160 is maintained, but the main receiver 1351 is transitioned into inactive mode 3099.

Figure 14:
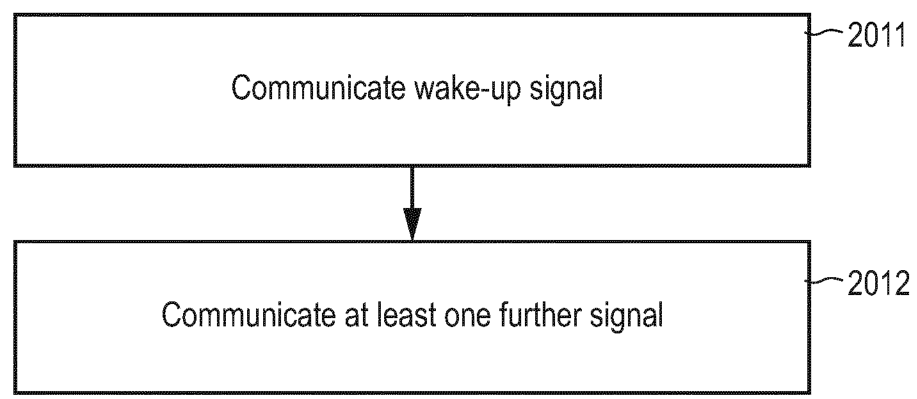
FIG. 14 is a flowchart of a method according to various examples.

FIG. 14 is a flowchart of a method according to various examples. For example, the method could be executed by the UE 130 (cf. FIG. 4). Alternatively or additionally, the method could be executed by the BS 112 (cf. FIG. 3).

First, in 2011, a wake-up signal is transmitted and/or received (communicated). For example, the wake-up signal may be transmitted by a BS. Alternatively or additionally, the wake-up signal may be received by a UE. The wake-up signal is communicated between the BS and a wake-up receiver of the device (cf. FIG. 9A: wake-up signal 4003).

Next, at least one further signal is communicated, 2012. The at least one further signal is communicated between the BS and the UE. For example, the at least one further signal may be an uplink (UL) signal and/or a DL signal. For example, the at least one further signal may be transmitted by the BS. Alternatively or additionally, the at least one further signal may be received by the UE. Alternatively or additionally, the at least one further signal may be transmitted by the UE. Alternatively or additionally, the at least one further signal may be received by the BS. An example includes at least one of the paging signals 4004, 4005 (cf. FIG. 9A).

In one example, the at least one further signal is communicated, in 2012, in accordance with the predefined MCS and/or the resource allocation. For example, the MCS may be defined prior to communicating the wake-up signal in 2011. Another example, the resource allocation—e.g. in frequency domain and/or time domain—may also be defined prior to communicating the wake-up signal in 2011, i.e., be pre-scheduled.

Hence, after waking up, the UE knows what to do—in terms of the particular MCS to use and/or the particular resource allocation of at least one further signal to be transmitted and/or received.

The MCS may define a certain type of modulation, e.g., Quadrature amplitude modulation (QAM), binary phase shift keying (BPSK), quadrature phase shift keying (QPSK), orthogonal frequency division multiplexing (OFDM), single carrier QAM (SC-QAM). For example, the MCS may define a certain bit loading/constellation. For example, the bit loading/constellation may specify how many bits per second or per frame can be communicated.

By using a predefined MCS for said communicating of the at least one further signal, the latency between communicating the wake-up signal and the at least one further signal may be reduced. In particular, if compared to reference implementations, it may be expendable to communicate an indicator of the MCS in between communicating the wake-up signal and the at least one further signal. For example, in reference implementations, a paging indicator may be indicative of the particular MCSs used for communicating a paging message (cf. FIG. 9A, 3006 and 3007). By using the predefined MCS, it may be expendable to communicate the paging indicator.

By avoiding communication of the paging indicator, both, the latency can be reduced, as well as reduced power consumption can be achieved. In particular, the paging indicator is typically communicated on the PDCCH control channel 262. Here, the main receiver 1351 may be configured to perform blind decoding and channel decoding, e.g., the Viterbi decoding. This can require significant energy.

A similar scenario may be observed for MTC UEs where often Coverage Enhancement (CE) is employed. CE employs a number of repetitions of the paging indicator encoded according to the same redundancy version, e.g., more than hundred or more than thousand repetitions. Reception of multiple repetitions is, again, requiring significant energy.

Furthermore, sometimes, the paging indicator may be scrambled using an ambiguous identity such as the P-RNTI. De-scrambling can require significant energy and may be vain if, later on, it is detected that the paging indicator was not even addressed to the particular UE.

From such effect as above it becomes apparent that releasing the UE 130 from the need to receive the paging indicator for determining the MCS can have various advantages.

In some examples, the method according to FIG. 14 may further include: prior to communicating the wake-up signal 2011, communicating, between the BS and the main receiver of the device, a control message indicative of the MCS for message 2012, and/or MCS for message 2011. For example, referring to FIG. 9A, the control message 4001 may be employed for signaling the MCS. By communicating a control message which is indicative of the MCS, this can be flexibly adjusted.

For example, the method may further include: determining the MCS. For example, different MCSs can be used for different UEs. For example, over the course of time different MCSs may be employed. This may help to tailor the MCS to the particular requirements imposed by the specific UE.

The control logic for determining the MCS may be implemented by the control circuitry 1122 of the BS 112. In other examples, it would also be possible that the control logic for determining the MCS is implemented by a network node of the core network, e.g., the MME 116.

Figure 15:
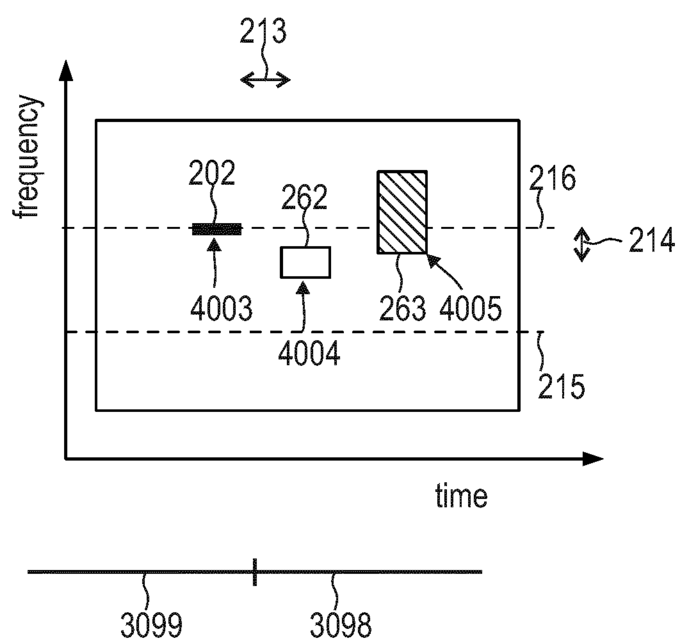
FIG. 15 schematically illustrates time-frequency resources allocated to a wake-up signal and further signals according to various examples.

FIG. 15 illustrates aspects with respect to a time frequency grid. FIG. 15 generally corresponds to FIG. 10. In FIG. 15, in addition to the resource 202 allocated to the wake-up signal 4003—communicated on carrier 216—, resources allocated to the paging indicator 4004, i.e., channel 262, and the paging message 4005, i.e., channel 262, are illustrated. The paging indicator 4004 and the paging message 4005 are communicated on carrier 215.

The paging indicator 4004 and the paging message 4005 are communicated between the BS 112 and the main receiver 1351 of the UE 130, i.e., using the carrier frequency 215; differently, the wake-up signal 4003 is communicated using the carrier frequency 216.

Based on the paging indicator 4004, the UE 130 can conclude on the MCS used for communicating the paging message 4005.

FIG. 15 also illustrates a true offset 213 and frequency offset 214 between the wake-up signal 4003 resources 202 and the paging indicator 4004 resources 262.

Figure 16:
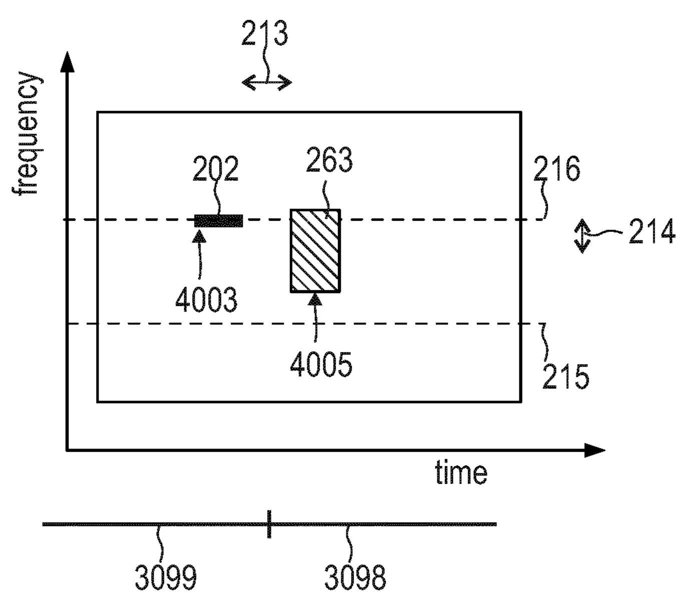
FIG. 16 schematically illustrates time-frequency resources allocated to a wake-up signal and a further signal according to various examples.

FIG. 16 illustrates aspects with respect to time frequency grid. FIG. 16 generally corresponds to FIG. 15. However, in the scenario of FIG. 16, the MCS used for communicating the paging message 4005 is predefined. Hence, it is not required to communicate the paging indicator 4004. This reduces the latency between communicating the wake-up signal 4003 and communicating the paging message 4005.

In some examples, it would also be possible that the time offset 213 and/or the frequency offset 214 between the resource 202 and the resource used for communicating the paging message 4005, i.e., a paging occasion, is predefined. For example, it could be possible that the time duration 213 is predefined such that sufficient time for transitioning the main receiver 1351 from the inactive state 3099 to the active state 3098 is provided. Again, it would be possible that a control message is communicated between the BS 112 and the main receiver of the UE 130 prior to transitioning the main receiver 1351 into the inactive state 3099. For example, the control message 4001 could be used in order to indicate the time offset 213 and/or the frequency offset 214.

It would be possible that the time offset 213 and/or the frequency offset 214 is set in accordance with a wake-up capability supported by the UE 130. For example, the offsets 213 and/or 214 may be set in accordance with the capability control message 4011 (cf. FIG. 9B), e.g., depending on whether the UE 130 includes or does not include the low-power receiver 1352. Thereby, a boot time required to activate the main receiver 1351 may be considered.

In some examples described herein, it may alternatively be possible to use dedicated resources 202 allocated to wake-up signals which are dedicated to specific UEs. In other words, it may be possible that different UEs are scheduled different resources 202 allocated to wake-up signals. Thereby, time-domain multiplexing and/or frequency-domain multiplexing may be implemented. Such a technique enables resolving ambiguities between multiple UEs simply by appropriately scheduling dedicated resources 202. Then, it may be expendable to include unique identities, e.g., in the wake-up signal 4003 and/or one or more further signal such as a paging message. This reduces the length of these signals and, therefore, reduces occupation of the spectrum.

Figure 17:
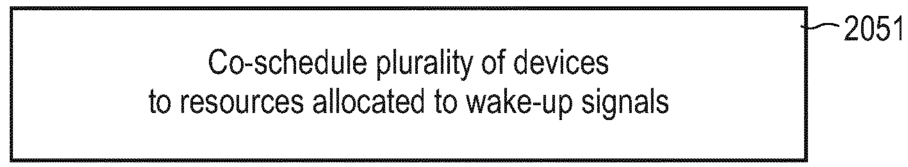
FIG. 17 is a flowchart of a method according to various examples.

FIG. 17 is a flowchart of a method according to various examples. In 2051, a plurality of UEs is co-scheduled to resources allocated to wake-up signals. In other words, the plurality of UEs may share the common resources. By co-scheduling the plurality of UEs on the same resources, it is possible to increase frequency reuse. In particular, it may be possible to support a larger count of UEs that may connect to the network.

When the plurality of UEs share the common resources, ambiguities may occur. For example, the network may intend to wake-up a first UE of the plurality of UEs; but the respective wake-up signal is received by each UE of the plurality of UEs, because all are listening to the common resources. Then, in order to avoid each one of the plurality of UEs to start communicating with the network, various techniques are conceivable to resolve the ambiguities.

In one example, code-division multiplexing may be employed in order to resolve the ambiguities. For example, the base sequence used for the wake-up signal may be UE-specific. Here, by choosing different base sequences, different UEs may be selectively addressed. If orthogonal or quasi-orthogonal base sequences are employed, then, the wake-up signal may be selectively received by individual UEs. It is possible to configure a code-division multiplex parameter of the wake-up signal (e.g., by means of the control message 4001, cf. FIG. 9). Then, the wake-up signal can be communicated in accordance with the code-division multiplex parameter which may be specific for the particular UE.

In some examples, collision may be avoided by coherently addressing each UE of the plurality of UEs by means of the respective wake-up signal and resolving ambiguities by a subsequently communicated further signal. In other words, the further signal may then be UE-specific and address individual UEs. This is illustrated by the method of the flowchart of FIG. 18.

In 2061, the wake-up signal is received. The wake-up signal encodes a group identity of a group of UEs. Then, in 2062, it is checked whether the wake-up signal is addressed to the active group. For example, the wake-up signal may include an indicator which is indicative of a particular group of UEs. The UE which receives the wake-up signal 2061 can then check whether the indicated group corresponds to the group associated with that UE. This may be done by cross-correlating the base code, as explained above, with a group-specific reference code. Generally, the group-specific reference code may be compared with the group identity encoded by the wake-up signal. In an alternative scenario, wake-up signals addressed to different groups may be scheduled to orthogonal resources, and each group of UEs may be configured to listen for specific resources. Thereby, the check of block 2062 can be to determine whether any wake-up signal has been received on the specific resources scheduled for the active group. This may be, in particular, applicable where the UEs of the group of UEs share common resources (cf. FIG. 18).

In the affirmative, in 2063, one or more further signals are received using the respective main receiver which has, meanwhile, transitioned into the active state. For example, in 2063, a paging indicator and/or a paging message may be received; hence, the grouping of UEs associated with communicating the wake-up signals can be done in accordance with assignment of UEs to paging occasions. The one or more further signals may encode a unique identity of a selected UE of the plurality of UEs. The ambiguity by the group-specific wake-up signal is thus resolved.

Figure 18:
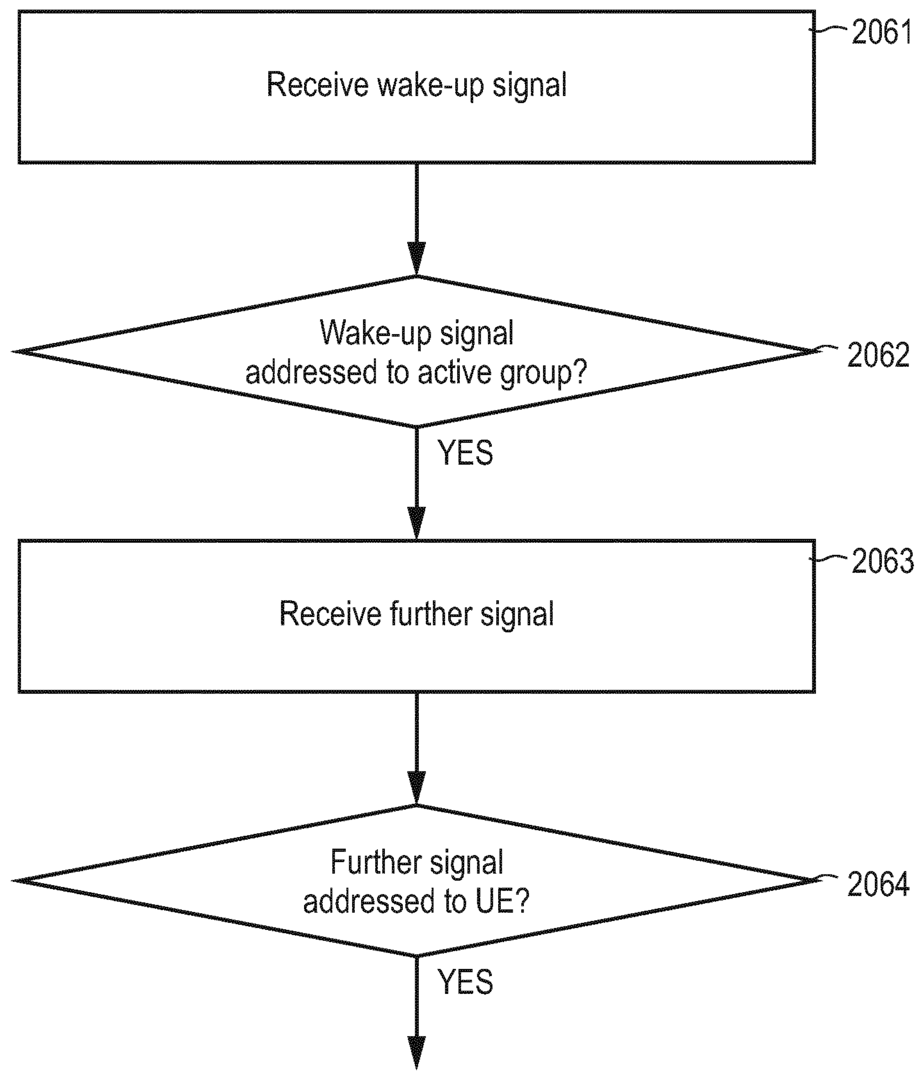
FIG. 18 is a flowchart of a method according to various examples.

A scenario is illustrated in FIG. 18 offers a balance between size-limited wake-up signals on the one hand side and overall power reduction on the other hand side. In particular, some main receivers of UEs may transition into the active state unnecessarily, because at check 2064 it turns out that the network was not seeking to wake-up those UEs. On the other hand, by using a group-specific wake-up signal, the number of UEs that wake-up unnecessarily is limited.

Summarizing, above Wake-up radio (WUR) mechanisms have been discussed. In these types of approach, a low-power low-performance wake-up receiver (WuRx) wakes up and listens to the channel (based on a certain schedule) for potential communications, i.e., a wake-up signal. Whenever the wake-up signal is detected by the WuRx, the more power hungry main receiver is powered up. The main benefit of WUR mechanisms is to be able to design a system with reachable nodes with low idle listening power consumption and reduced communication delay.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above various scenarios have been disclosed with respect to a stationary BS, in other examples, the BS may be implemented by a mobile entity; in such a scenario, the BS is sometimes labeled relay.

For further illustration, while above various examples have been described with respect to the 3GPP LTE protocol, in other examples, other protocols may be employed. For example, while reference has been primarily made to the PDCCH above, respective control channels may also refer to MPDCCH (MTC PDCCH), NPDCCH (NB-IoT PDCCH) or any similar control channel in other radio access techniques, including 3GPP 5G New Radio (NR).

For further illustration, above, various examples have been described where the wake-up signal is received by a low-power receiver. Such techniques may be likewise employed in a scenario where there is no dedicated low-power receiver, but a main receiver which may operate in a low-power state and a high-power state. Then, the wake-up signal may be received in the low-power state of the main receiver. The various examples described herein may all benefit from such a receiver architecture including only the main receiver.

For still further illustration, techniques as described throughout can also be applied to other radio access technologies and protocols such as 5G New Radio (NR), and NR-IoT.

The invention claimed is:

1. A method, comprising:

communicating, between a base station of a network and a terminal, at least one downlink control message indicative of a plurality of reoccurring resources allocated to a wake-up signal;

prior to communicating the wake-up signal between the base station and the terminal, communicating a modulation and/or coding scheme (MCS) signal between the base station and the terminal, wherein the MCS is to be used in communicating at least one further signal between the base station and the terminal;

communicating, between the base station and the terminal, the wake-up signal in at least one resource of the plurality of reoccurring resources; and in response to said communicating of the wake-up signal, communicating at least one further signal between the base station and the terminal in accordance with the MCS, wherein the plurality of reoccurring resources allocated to the wake-up signal correspond to resource elements of a time-frequency resource grid, wherein a resource element of the time-frequency resource grid is defined by a symbol modulated by a certain constellation.

2. The method of claim 1, wherein:

the communicating the at least one downlink control message occurs prior to the communicating the wake-up signal;

the downlink control message is indicative of a time-offset between said communicating the wake-up signal in the at least one resource of the plurality of reoccurring resources and said communicating of the at least one further signal.

3. The method of claim 1, wherein:

the at least one downlink control message is further indicative of a code-division multiplex parameter of the wake-up signal; and the wake-up signal is communicated in accordance with the code-division multiplex parameter.

4. The method of claim 1, further comprising:

co-scheduling a plurality of terminals to the plurality of reoccurring resources, the plurality of terminals comprising the terminal.

5. The method according to claim 1, wherein:

the communicating the MCS signal between the base station and the terminal comprises communicating the MCS signal from the terminal to the base station.

6. A device comprising control circuitry configured to:

communicate, between a base station of a network and a terminal, at least one downlink control message indicative of a plurality of reoccurring resources allocated to a wake-up signal;

prior to communicating the wake-up signal between the base station and the terminal, predefining a modulation and/or coding scheme (MCS) to be used in communicating at least one further signal between the base station and the terminal;

communicate, between the base station and the terminal, the wake-up signal in at least one resource of the plurality of reoccurring resources; and in response to said communicating of the wake-up signal, communicate at least one further signal between the base station and the terminal in accordance with the predefined MCS, wherein the plurality of reoccurring resources allocated to the wake-up signal correspond to resource elements of a time-frequency resource grid, wherein a resource element of the time-frequency resource grid is defined by a symbol modulated by a certain constellation.

7. The device according to claim 6, wherein:

the predefining the MCS comprises communicating an MCS signal comprising the MCS between the base station and the terminal.

* * * * *